United States Patent
Lee et al.

(10) Patent No.: US 9,014,146 B2
(45) Date of Patent: Apr. 21, 2015

(54) NETWORK REDIRECTION IN HETEROGENEOUS OVERLAY NETWORKS

(71) Applicant: KT Corporation, Gyeonggi-do (KR)

(72) Inventors: Ki-Ho Lee, Gyeonggi-do (KR); Yong-Gyoo Lee, Seoul (KR); Yung-Ha Ji, Gyeonggi-do (KR)

(73) Assignee: KT Corporation, Gyeonggi-do (KR)

( * ) Notice: Subject to any disclaimer, the term of this patent is extended or adjusted under 35 U.S.C. 154(b) by 158 days.

(21) Appl. No.: 13/661,004

(22) Filed: Oct. 25, 2012

(65) Prior Publication Data

US 2013/0107737 A1    May 2, 2013

(30) Foreign Application Priority Data

Oct. 27, 2011  (KR) .................. 10-2011-0110624

(51) Int. Cl.
*H04W 4/00* (2009.01)
*H04W 36/30* (2009.01)
*H04W 36/14* (2009.01)

(52) U.S. Cl.
CPC .............. *H04W 36/30* (2013.01); *H04W 36/14* (2013.01)

(58) Field of Classification Search
CPC .............................. H04W 36/18; H04W 36/24
USPC ........ 370/331, 332, 329; 455/436, 552.1, 437
See application file for complete search history.

(56) References Cited

U.S. PATENT DOCUMENTS

| | | | |
|---|---|---|---|
| 5,864,760 A | 1/1999 | Gilhousen et al. | |
| 6,081,714 A | 6/2000 | Wakizaka | |
| 6,466,790 B2 | 10/2002 | Haumont et al. | |
| 6,526,028 B1 | 2/2003 | Kondo | |
| 6,728,919 B1 | 4/2004 | Kondo et al. | |
| 6,845,238 B1 * | 1/2005 | Muller | 455/436 |
| 6,975,604 B1 | 12/2005 | Ishida et al. | |

(Continued)

FOREIGN PATENT DOCUMENTS

| KR | 10-0304781 B1 | 9/2001 |
|---|---|---|
| KR | 10-2005-0068400 A | 7/2005 |

(Continued)

OTHER PUBLICATIONS

Ralf Irmer et al., "Coordinated multipoint: Concepts, Performance, and Field Trial Results", IEEE Communications Magazine, Feb. 2011, pp. 102-111, vol. 49, Issue 2.

(Continued)

*Primary Examiner* — Chandrahas Patel
(74) *Attorney, Agent, or Firm* — IP Legal Services, LLC (57) ABSTRACT

Described embodiments provide a method and apparatus for redirecting user equipment from a current serving cell of a first network to a corresponding target cell of a second network in a heterogeneous overlay network environment. A current serving base station of the first network may receive signal quality measurements from user equipment coupled to the current serving cell of the first network. Based on the received signal quality measurements, the current serving base station may determine whether signal quality of the user equipment is lower than predetermined reference quality based on at least one of the received signal quality measurements. When the signal quality of the user equipment is lower than the predetermined reference quality, the current serving base station may redirect the user equipment from the current serving cell of the first network to the corresponding target cell of the second network.

19 Claims, 7 Drawing Sheets

(56) References Cited

U.S. PATENT DOCUMENTS

| | | |
|---|---|---|
| 7,072,655 B2 | 7/2006 | Ikeda et al. |
| 7,200,403 B2 | 4/2007 | Hamabe |
| 7,796,514 B2 | 9/2010 | Noriega |
| 8,045,926 B2 | 10/2011 | Martikkala et al. |
| 8,149,895 B2 | 4/2012 | Bolourchi et al. |
| 8,165,089 B2 | 4/2012 | Jung et al. |
| 8,379,567 B2 | 2/2013 | Cho et al. |
| 8,406,193 B2 | 3/2013 | Cho et al. |
| 8,446,869 B2 | 5/2013 | Lee et al. |
| 8,472,921 B2 | 6/2013 | Yang et al. |
| 8,509,783 B2 * | 8/2013 | Iwamura ............ 455/438 |
| 2001/0011019 A1 | 8/2001 | Jokimies |
| 2004/0203926 A1 | 10/2004 | Ruutu et al. |
| 2004/0235510 A1 | 11/2004 | Elicegui et al. |
| 2005/0048980 A1 | 3/2005 | Kumar et al. |
| 2005/0249322 A1 | 11/2005 | Gerlach |
| 2006/0092872 A1 | 5/2006 | Lee et al. |
| 2006/0178153 A1 | 8/2006 | Tenny et al. |
| 2007/0087689 A1 | 4/2007 | Alles et al. |
| 2007/0184841 A1 | 8/2007 | Choi et al. |
| 2008/0139204 A1 | 6/2008 | Hsieh et al. |
| 2008/0199183 A1 | 8/2008 | Liu et al. |
| 2008/0219222 A1 | 9/2008 | Lo et al. |
| 2009/0135778 A1 | 5/2009 | Lee et al. |
| 2009/0238143 A1 | 9/2009 | Mukherjee et al. |
| 2009/0310568 A1 | 12/2009 | Chen et al. |
| 2010/0008324 A1 | 1/2010 | Lee et al. |
| 2010/0015978 A1 | 1/2010 | Yoon et al. |
| 2010/0075679 A1 | 3/2010 | Tenny et al. |
| 2010/0113032 A1 | 5/2010 | Lee et al. |
| 2010/0136979 A1 | 6/2010 | Yang et al. |
| 2010/0144334 A1 | 6/2010 | Gorokhov et al. |
| 2010/0178916 A1 | 7/2010 | Jamadagni |
| 2010/0216474 A1 | 8/2010 | Park et al. |
| 2010/0273485 A1 | 10/2010 | Huang et al. |
| 2010/0278146 A1 | 11/2010 | Aoyama et al. |
| 2010/0278150 A1 | 11/2010 | Park et al. |
| 2011/0013560 A1 | 1/2011 | Zhang et al. |
| 2011/0016214 A1 | 1/2011 | Jackson |
| 2011/0022812 A1 | 1/2011 | van der Linden et al. |
| 2011/0092214 A1 | 4/2011 | Iwamura |
| 2011/0176477 A1 | 7/2011 | Lee et al. |
| 2011/0176485 A1 | 7/2011 | Pudney et al. |
| 2011/0207459 A1 | 8/2011 | Ramasamy et al. |
| 2011/0237272 A1 | 9/2011 | Gorokhov et al. |
| 2011/0274040 A1 | 11/2011 | Pani et al. |
| 2011/0312355 A1 | 12/2011 | Cheng et al. |
| 2012/0039216 A1 | 2/2012 | Li et al. |
| 2012/0221683 A1 | 8/2012 | Ferris |
| 2012/0322477 A1 | 12/2012 | Kang et al. |
| 2013/0089021 A1 | 4/2013 | Gaal et al. |
| 2013/0103844 A1 | 4/2013 | Bulut et al. |
| 2013/0163416 A1 | 6/2013 | Lee et al. |
| 2013/0242951 A1 | 9/2013 | Lee et al. |
| 2014/0052864 A1 | 2/2014 | Van Der Linden et al. |

FOREIGN PATENT DOCUMENTS

| | | | |
|---|---|---|---|
| KR | 10-2005-0121136 | A | 12/2005 |
| KR | 10-2006-0016016 | A | 2/2006 |
| KR | 10-2006-0040237 | A | 5/2006 |
| KR | 10-2007-0079633 | A | 8/2007 |
| KR | 10-2007-0110348 | A | 11/2007 |
| KR | 10-2008-0026855 | A | 3/2008 |
| KR | 10-2008-0041543 | A | 5/2008 |
| KR | 10-2008-0041545 | A | 5/2008 |
| KR | 10-2008-0064691 | A | 7/2008 |
| KR | 10-2008-0080801 | A | 9/2008 |
| KR | 10-0873386 | B1 | 12/2008 |
| KR | 10-2009-0034261 | A | 4/2009 |
| KR | 10-2009-0073443 | A | 7/2009 |
| KR | 10-0920894 | B1 | 10/2009 |
| KR | 10-2010-0003664 | A | 1/2010 |
| KR | 10-2010-0004833 | A | 1/2010 |
| KR | 10-2010-0021156 | A | 2/2010 |
| KR | 10-2010-0029869 | A | 3/2010 |
| KR | 10-2010-0035088 | A | 4/2010 |
| KR | 10-2010-0048841 | A | 5/2010 |
| KR | 10-2010-0060353 | A | 6/2010 |
| KR | 10-2010-0066875 | A | 6/2010 |
| KR | 10-2010-0064382 | A | 8/2010 |
| KR | 10-2010-0092742 | A | 8/2010 |
| KR | 10-0976943 | B1 | 8/2010 |
| KR | 10-2010-0126776 | A | 12/2010 |
| KR | 10-2010-0126818 | A | 12/2010 |
| KR | 10-2010-0133821 | A | 12/2010 |
| KR | 10-1030897 | B1 | 4/2011 |
| KR | 10-2011-0094140 | A | 8/2011 |
| KR | 10-2011-0097702 | A | 8/2011 |
| KR | 10-2011-0099327 | A | 9/2011 |
| WO | 2008/110924 | A2 | 9/2008 |
| WO | 2010/068769 | A1 | 6/2010 |
| WO | 2010/123270 | A2 | 10/2010 |
| WO | 2010/127365 | A1 | 11/2010 |
| WO | 2011/022733 | A2 | 2/2011 |

OTHER PUBLICATIONS

ETSI TS 123 272 V8.1.0, "Digital cellular telecommunications system (Phase 2+); Universal Mobile Telecommunications System (UMTS); Circuit Switched (CS) fallback in Evolved Packet System (EPS); Stage 2", ETSI, Nov. 2008, pp. 1-47.

* cited by examiner

NETWORK REDIRECTION IN HETEROGENEOUS OVERLAY NETWORKS

CROSS REFERENCE TO PRIOR APPLICATIONS

The present application claims priority under 35 U.S.C. §119 to Korean Patent Application No. 10-2011-0110624 (filed on Oct. 27, 2011), which is hereby incorporated by reference in its entirety.

The subject matter of this application is related to U.S. patent application Ser. No. 13/660,988 filed Oct. 25, 2012, the teachings of which are incorporated herein their entirety by reference.

FIELD OF THE INVENTION

The present invention relates to communication and, in particular, to redirecting user equipment from one network to the other in heterogeneous overlay network environment.

BACKGROUND OF THE INVENTION

Evolved Universal Mobile Telecommunication System Terrestrial Radio Access Network (E-UTRAN), also known as Long Term Evolution (LTE) network, delivers information at a high data transmit rate with low latency. Such an E-UTRAN has been built over a UMTS terrestrial radio access network (UTRAN), also known as wideband code division multiple access network (WCDMA). For example, E-UTRAN cells may be overlaid on UTRAN cells.

User equipment may have poor reception signal quality due to many reasons. For example, when user equipment is located at an edge of one E-UTRAN cell or when a serving base station of an E-UTRAN cell has great data traffic load, the user equipment may have poor reception signal quality. In this case, it might need to redirect the user equipment from one network to the other in heterogeneous overlay network environment.

SUMMARY OF THE INVENTION

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, user equipment may be redirected from one network to the other in heterogeneous overlay network environment when the user equipment has poor reception signal quality.

In accordance with another aspect of the present invention, user equipment may be redirected from an E-UTRAN such as a LTE network to a UTRAN such as a WCDMA network when user equipment has poor reception signal quality.

In accordance with an embodiment of the present invention, a method may be provided for redirecting user equipment from a current serving cell of a first network to a corresponding target cell of a second network in a heterogeneous overlay network environment. The method at a current serving base station may include receiving signal quality measurements from user equipment coupled to the current serving cell of the first network, determining whether signal quality of the user equipment is lower than predetermined reference quality based on at least one of the received signal quality measurements, and redirecting the user equipment from the current serving cell of the first network to the corresponding target cell of the second network when the signal quality of the user equipment is lower than the predetermined reference quality.

The signal quality measurements may be results of measuring at least one of interference and noise ratio (SINR) and reference signal received power (RSRP) of a reception signal of the user equipment.

The determining may include comparing at least one of the signal quality measurements with corresponding predetermined thresholds, determining the signal quality of the user equipment is lower than the predetermined reference quality when the at least one of the signal quality measurements is lower than the corresponding thresholds, determining whether the signal quality of the user equipment maintains lower than the predetermined reference quality for a predetermined duration, and deciding to redirect the user equipment from the current serving cell of the first network to the corresponding target cell of the second network when the signal quality of the user equipment maintains lower for the predetermined duration.

The redirecting may include releasing connection between the user equipment and the first network and informing the user equipment of the releasing the connection from the first network.

The releasing may include performing a radio resource control (RRC) release procedure.

The informing may include transmitting a RRC connection release message to the user equipment. The RRC connection release message may include information on the corresponding target cell of the second network.

The redirecting may further include selecting one of multiple carriers assigned to the corresponding target cell of the second network and providing information on the selected carrier to the user equipment.

The selecting may include using an equation: "X mod N" to select the one of multiple carriers assigned to the corresponding target cell of the second network, where X denotes a total number of network redirections performed associated with the corresponding target cell of the second network and N denotes a total number of carriers assigned to the corresponding target cell of the second network, and selecting one having identification matched with the result of the equation from the carriers assigned to the corresponding target cell.

The providing may include including the information on the selected carrier in a RRC connection release message and transmitting the RRC connection release message to the user equipment.

The first network may be evolved universal mobile telecommunication system terrestrial radio access network (E-UTRAN) and the second network is UTRAN.

In accordance with another embodiment of the present invention, a method may be provided for redirecting user equipment from a current serving cell of a first network to a corresponding target cell of a second network in a heterogeneous overlay network environment. The method at the user equipment may include transmitting signal quality measurements to a current serving base station of the first network, receiving a connection release message from the current serving base station of the first network, and establishing connection to the corresponding target cell of the second network based on information included in the connection release message.

The transmitting may include measuring at least one of interference and noise ratio (SINR) and reference signal received power (RSRP) of a reception signal of the user equipment and providing the measurements of the at least one of SINR and RSRP to the current serving base station of the first network.

The connection release message may be a radio resource control (RRC) connection release message.

The RRC connection release message may include information on a carrier of the corresponding target cell of the second network, to be used for communication with the corresponding target cell.

The establishing may include performing a routing area update procedure based on information included in the connection release.

The method may further include receiving a communication service from the corresponding target base station of the second network after the establishing and transmitting signal quality measurements to the corresponding target base station of the second network.

In accordance with still another embodiment of the present invention, an apparatus may be provided for redirecting user equipment from a current serving cell of a first network to a corresponding target cell of a second network in a heterogeneous overlay network environment. The apparatus may include a receiving unit, a redirection unit, and a transmitting unit. The receiving unit may be configured to receive signal quality measurements from user equipment coupled to the current serving cell of the first network. The redirection unit may be configured to determine whether signal quality of the user equipment is lower than a predetermined reference quality based on at least one of the received signal quality measurements and to perform a network redirect procedure when the signal quality of the user equipment is determined as lower than the predetermined reference quality. The transmitting unit may be configured to transmit a connection release message to the user equipment after the network redirection procedure.

The redirection unit may be configured to compare at least one of the signal quality measurements with corresponding thresholds, to determine the signal quality of the user equipment is lower than the predetermined reference quality when the at least one of the signal quality measurements is lower than the corresponding thresholds, to determine whether the signal quality of the user equipment maintains lower than the predetermined reference quality for a predetermined duration, and to decide to redirect the user equipment from the current serving cell of the first network to the corresponding target cell of the second network when the signal quality of the user equipment maintains for the predetermined duration.

The redirection unit may be configured to perform a radio resource control (RRC) connection release procedure in order to release connection between the user equipment and the first network. The transmitting unit may be configured to transmit a RRC connection release message including information on the corresponding target cell of the second network The redirection unit may be configured to select one of multiple carriers assigned to the corresponding target cell of the second network and to provide information on the selected carrier to the user equipment through the RRC connection release message.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with embodiments of the present invention, user equipment may be redirected from one network to the other in heterogeneous overlay network environment when reception signal quality of the user equipment is poor. The reception signal quality of the user equipment may be measured and reported regularly. Based on such reports, network redirection may be determined. Hereinafter, heterogeneous overlay network environments including an E-UTRAN and a UTRAN will be described with reference to FIG. 1.

Figure 1:
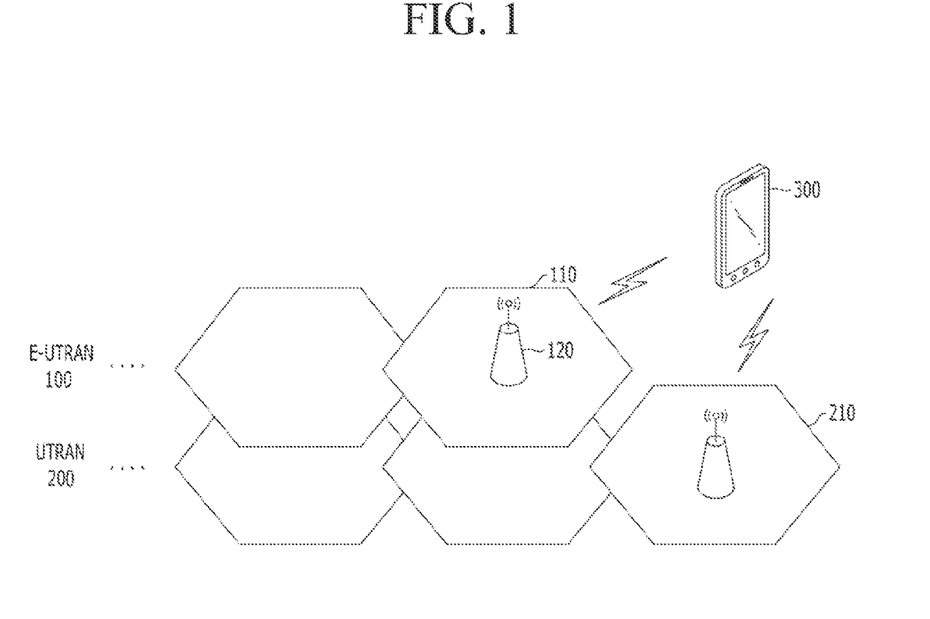
FIG. 1 shows heterogeneous overlay networks in accordance with embodiments of the present invention.

FIG. 1 shows heterogeneous overlay networks including an E-UTRAN and a UTRAN in accordance with embodiments of the present invention.

Referring to FIG. 1, the typical heterogeneous overlay network may include E-UTRAN 100 and UTRAN 200. As show, two different types of networks are overlaid on each other. For example, E-UTRAN 100 is overlaid on UTRAN 200. E-UTRAN 100 may be a long term evolution (LTE) network and UTRAN 200 may be a wideband code division multiple access (WCDMA) network. E-UTRAN 100 may include a plurality of E-UTRAN cells 110 and UTRAN 200 may have a plurality of UTRAN cells 210.

Particularly, E-UTRAN cell 110 may be governed by base station 120. Base station 120 of E-UTRAN cell 110 provides a communication service to user equipment 300 coupled thereto. User equipment 300 may be coupled to base station 120 and provided with the communication service from base station 120. Base station 120 may be referred to as an evolved node B (eNodeB) of a LTE network. When user equipment 300 is located at an edge area of E-UTRAN cell 110, a reception signal of user equipment 300 may have poor signal quality. In this case, user equipment 300 may be redirected from E-UTRAN cell 110 to UTRAN cell 210 in accordance with at least one of embodiments of the present invention.

For convenience and ease of understanding, user equipment 300 will be described as being initially coupled to E.-UTRAN cell 110 and redirected to UTRAN cell 210 as shown in FIG. 1, The present invention, however, is not limited thereto. In accordance with another embodiment of the present invention, user equipment 300 may be initially coupled to UTRAN cell 210 and redirected to E-UTRAN cell 110 when the reception signal of user equipment 300 has poor signal quality.

As described, user equipment 300 may be redirected from one network to the other in heterogeneous overlay network environment when the reception signal of user equipment 300 has poor signal quality. For redirection from one network to the other, the following procedure may be performed in accordance with at least one of embodiments of the present invention.

Figure 2:
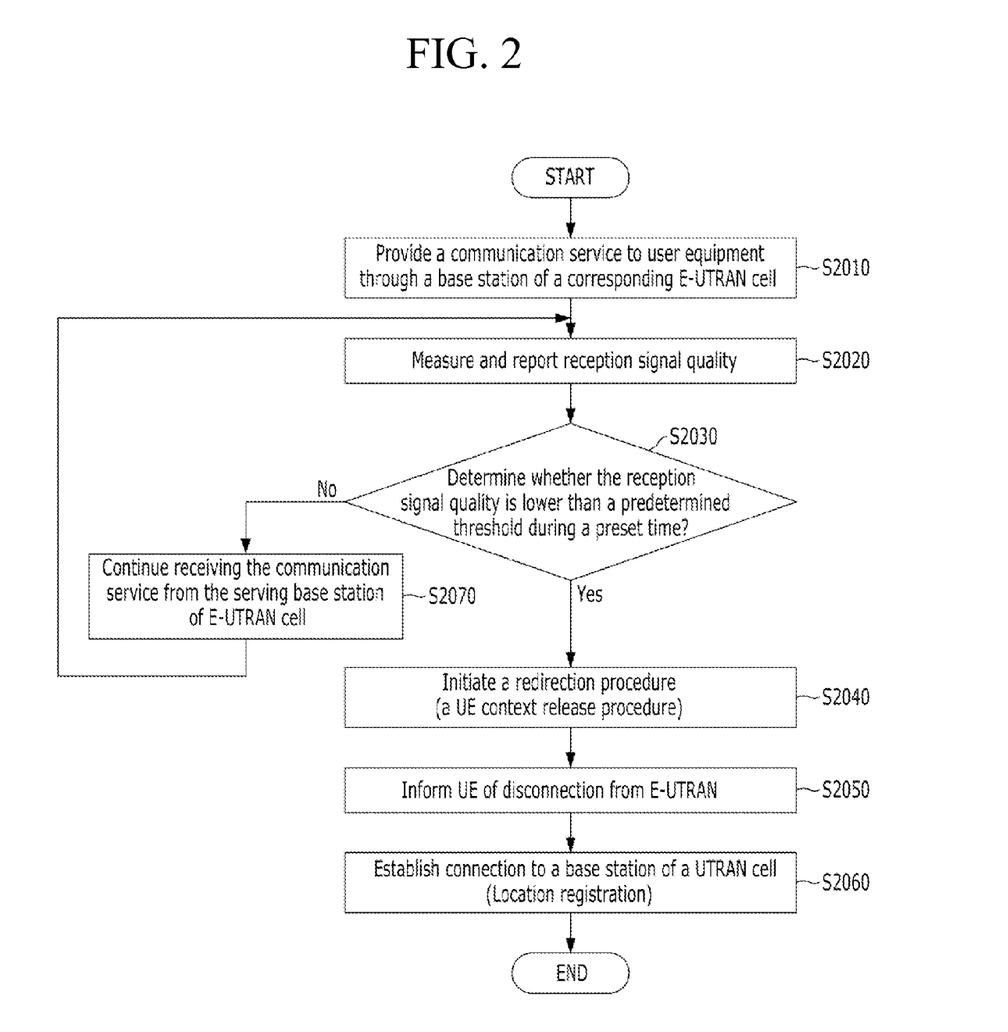
FIG. 2 shows network redirection in accordance with embodiments of the present invention.

FIG. 2 shows network redirection in heterogeneous overlay network environment in accordance with embodiments of the present invention.

Referring to FIG. 2, connection may be established between user equipment 300 and base station 120 of E-UTRAN 100 and a communication service may be provided to user equipment 300 at step S2010. For example, when user equipment 300 enters a service area of base station 120 of E-UTRAN 100, user equipment 300 may establish connection to base station 120 and a communication service may be provided to user equipment 300 through base station 120 of E-UTRAN 100.

At step S2020, reception signal quality may be regularly measured and reported. For example, user equipment 300 may regularly measure quality of a reception signal and report the measurement results to base station 120 of E-UTRAN 100, which is a current serving base station. The reception signal quality may be evaluated based on at least one of a signal to interference and noise ratio (SINR), a signal to noise ratio (SNR), and a reference signal received power (RSRP). That is, user equipment 300 may measure at least one of SINR, SNR, and/or RSRP of reception signals and transmit the measurement result to base station 120 of E-UTRAN 100 in accordance with embodiments of the present invention.

At step S2030, a network redirection determination procedure may be performed based on the measurements of the reception signal quality. That is, determination may be made as to whether the reception signal quality of user equipment 300 is poor based on the measurements of the reception signal quality from user equipment 300. For example, base station 120 may receive multiple measurement results of the reception signal quality for the predetermined duration. Base station 120 may compare the received measurement results with a predetermined threshold. For example, the measurement results of the signal quality might include at least one of SINR, SNR, and RSRP. The signal quality associated with user equipment 300 might be evaluated based on at least one of the measurement results of SINR, SNR, and RSRP. For example, base station 120 may consider only one of the measurement results of SINR, SNR, and RSRP in the signal quality report to evaluate the reception signal quality associated with user equipment 300. The present invention, however, is not limited thereto. Base station 120 may consider at least two of the measurement results of SINR, SNR, and RSRP to evaluate the reception signal quality associated with user equipment 300. Particularly, base station 120 may decide the redirection of user equipment 300 from a current serving network to the other in the heterogeneous overlay network environment when the selected measurement results are lower than the corresponding thresholds and the poor reception signal quality of user equipment 300 maintains for a predetermined duration T. Base station 120 may set up the predetermined time T per each cell. Furthermore, base station 120 may set up the predetermined threshold per each cell.

When the measured reception signal quality of user equipment 300 is tower than the predetermined threshold and such low reception signal quality maintains for the predetermined duration (Yes - S2030), a network redirection procedure may be initiated at step S2040. For example, base station 120 decides to redirect user equipment 300 from the current serving network such as E-UTRAN 100 to the other such as UTRAN 200 in heterogeneous overlay network environment when the measured reception signal quality of user equipment 300 is lower than the predetermined threshold and the low reception signal quality maintain for the predetermined duration. The reception signal quality may be poor when user equipment 300 is located at edge of E-UTRAN cell 110. In this case, base station 120 may decide to redirect user equipment 300 from E-UTRAN cell 110 to UTRAN cell 210. Upon the initiation of the redirection procedure, base station 120 may release connection between user equipment 300 and the current serving network E-UTRAN 100. In order to release the connection, base station 120 may perform a RRC connection release procedure including a UE context release procedure. As a. result, user equipment 300 may be in an idle state in E-UTRAN 100, The RRC connection release procedure including the UE context release procedure will be described in more detail with reference to FIG. 3.

At step S2050, user equipment 300 may be informed of disconnection from E-UTRAN 100. After releasing the connection between user equipment 300 and the current serving network E-UTRAN 100, base station 120 may transmit a RRC connection release message to user equipment 300. Upon the receipt of the RRC connection release message, user equipment 300 may be aware of the disconnection from E-UTRAN 100. Thereafter, user equipment 300 may establish connection to a new network based on information included in the RRC connection release message for the next communication service. For example, the RRC connection release message may include information on frequency allocations (FAs), also referred to as multiple carriers, assigned to a corresponding cell of UTRAN 200 where user equipment 300 is redirected to.

At step S2060, user equipment 300 may establish connection to UTRAN 200. For example, user equipment 300 may be required to be connected to a corresponding cell of UTRAN 200 for the next communication service. In this case, user equipment 300 may establish connection to the corresponding cell of UTRAN 200 using information included in the RRC connection release message. That is, user equipment 300 may perform a location registration procedure based on the information included in the RRC connection release message. Particularly, a routing area update procedure may be preformed for location registration. Thereafter, user equipment 300 may receive a communication service through UTRAN cell 210 for the next communication service.

When it is determined that the reception signal quality is not poor or the poor quality does not maintain for the predetermined direction (No—S2030), connection to the current serving network such as E-UTRAN 100 maintains and user equipment 300 may continuously receive the communication service from the current serving base station 120 at step S2070.

As described, when base station 120 decides to redirect user equipment 300 from one network to the other in the heterogeneous overlay network environment, user equipment 300 may be released from the current serving network, for example, E-UTRAN 100. That is, base station 120 may perform a RRC connection release procedure may be performed for disconnecting user equipment 300 from the current serving network E-UTRAN 100. Hereinafter, such operation of base station 120 will be described with reference to FIG. 3.

Figure 3:
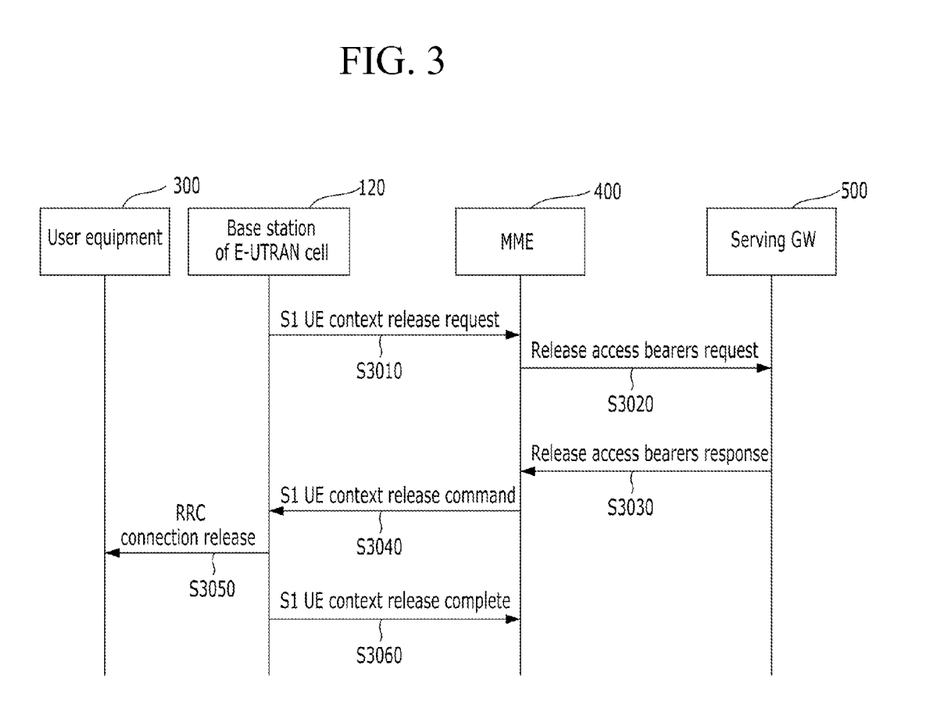
FIG. 3 shows releasing connection between a base station and a serving network in heterogeneous overlay network environment in accordance with embodiments of the present invention.

FIG. 3 shows releasing connection between user equipment and a current serving network for network redirection in accordance with embodiments of the present invention.

Referring to FIG. 3, when base station 120 decides to redirect user equipment 300 from one network to the other in the heterogeneous overlay network environment, base station 120 may initiate a redirection procedure. Upon the initiation of the redirection procedure, base station 120 may perform a radio recourse control (RRC) connection release procedure to release the connection between user equipment 100 and the current serving network E-UTRAN 100. At step S3010, base station 120 may request mobility management entity (MME) 400 to release a UE context set associated with user equipment 300. In order to request, base station 120 may transmit a S1 UE context release request message to MME 400. The context release request message may include various types of information as shown in Table 1 below.

TABLE 1

| IE/Group Name | Presence | Range | IE type and reference | Semantics description | Criticality | Assigned criticality |
|---|---|---|---|---|---|---|
| Message type | M | | 9.2.1.1 | | YES | Ignore |
| MME UE S1AP ID | M | | 9.2.3.3 | | YES | Reject |
| eNB UE S1AP ID | M | | 9.2.3.4 | | YES | Reject |
| Cause | M | | 9.2.1.3 | | YES | ignore |

As shown in Table 1, the context release request message may include a message type information element, a MME UE S1 AP ID information element, an eNB UE S1 AP ID information element, and a Cause information element. The message type information element may indicate a type of a message. The MME UE S1 AP ID information element may indicate identification between MME 400 and user equipment 300. The eNB UE S1AP ID information element may indicate identification between eNodeB such as base station 120 and user equipment 300. The Cause information element may indicate a cause of context release request. In accordance with at least one embodiment of the present invention, the Cause information element may be used to indicate that the network redirection causes the context release request as shown in Table 2 below.

TABLE 2

| IE/Group Name | Presence | Range | IE Type and Reference | Semantics Description |
|---|---|---|---|---|
| CHOICE Cause group | M | | | |
| >Radio Network Layer | | | | |
| >>Radio Network Layer Cause | M | | ENUMERATED (Inter-RAT redirection) | |

As shown in Table 2, the Cause information element may be set to "Inter-RAT redirection" and it may indicate that the cause of the context release request is the network redirection between the heterogeneous overlay networks.

At step S3020, MME 400 may receive the context release request message from base station 120 and request serving gateway (serving-GW) 500 to release access bearers associated with user equipment 300. In order to request, MME 400 may transmit a release access bearers request message to Serving GW 500.

At step S3030, serving-GW 500 may receive the release access bearers request message from MME 400, release access bearers associated with user equipment 300, and transmit a release access bearers response message to MME 400.

At step S3040, MME 400 may receive the release access bearers response message and transmit a S1 UE context release command message to base station 120 for user equipment 300.

At step S3050, base station 120 may receive the S1 UE context release command message and transmit a RRC connection release message to user equipment 120. After transmitting the RRC connection release message, base station 120 may transmit a S1 UE context release complete message to MME 400 at step S3060.

When user equipment 300 is redirected from E-UTRAN 100 to UTRAN 200, user equipment 300 may be provided with information on frequency allocation s (FAs) of a corresponding UTRAN cell through the RRC connection release message. For example, such FA information may be included in an object "RedirectedCarrierInfor" as shown in Table 3 below. Table 3 shows the RRC connection release message including the network redirection information. As shown, the RRC connection release message may include "RedirectedCarrierInfor" in order to include the network redirection information.

TABLE 3

RRCConnectionRelease-r8-IEs ::= SEQUENCE {
    releaseCause    ReleaseCause,
    redirectedCarrierInfo    RedirectedCarrierInfo
}

For example, "RedirectedCarrierInfor" may be set to indicate a next service network as described in Table 4 below.

TABLE 4

RedirectedCarrierInfor ::= CHOICE {
    utra-FDD    ARFCN-ValueUTRA,
}

For example, a variable "utra-FDD" may indicate FA to be used in a related network. When about 2.1 GHz and about 900 MHz are available in a corresponding UTRAN cell, the variable "utra-FDD" may be set as one of about 2.1 GHz and about 900 MHz. The variable "AFRCN-ValueUTRA" may include a value indicating one of about 2.1 GHz and about 900 MHz. After a FA to be used for the next serving network such as UTRAN 200 is decided, the variable "AFRCN-ValueUTRA" is set accordingly. "AFRCN-ValueUTRA" may stand for "Absolute Radio Frequency Channel Number (ARFCN)-ValueUTRA." In accordance with at least one embodiment of the present invention, the variable "ARFCN-ValueUTRA" may be determined according to a frequency allocation technique for load distribution. Such FAs assigned to UTRAN cell 210 and frequency distribution operation will be described with reference to FIG. 4 and FIG. 5.

Figure 4:
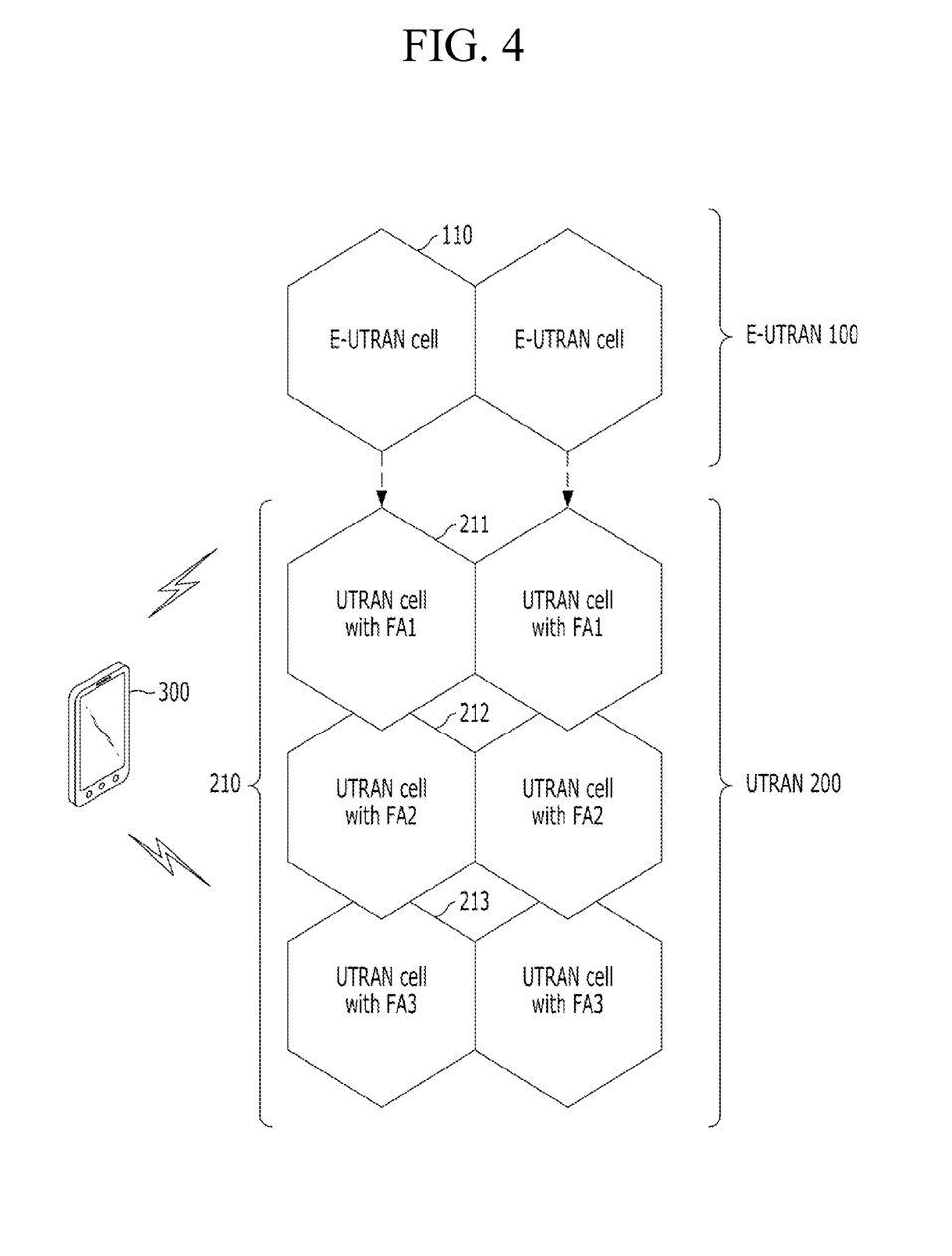
FIG. 4 shows multiple carriers assigned to each cell in a UTRAN in accordance with embodiments of the present invention.

FIG. 4 shows UTRAN cells each allocated with multiple carriers in accordance with embodiments of the present invention.

Referring to FIG. 4, E-UTRAN 100 may include E-UTRAN cells. UTRAN 200 may include a plurality of UTRAN cells. Unlike E-UTRAN cells, multiple carriers such as frequency allocations (FAs) may be assigned to each UTRAN cell. Such FAs may be referred to as carriers. In case of three carriers (FAs) assigned to each UTRAN cell, E-UTRAN cell 110 may be logically mapped to three UTRAN cells 211, 212, and 213. For example, UTRAN cell 211 is assigned with first carrier FA1, UTRAN cell 212 is assigned with second carrier FA2, and UTRAN cell 213 is assigned with third carrier FA3.

Accordingly, when the network redirection is decided from E-UTRAN cell 100 to UTRAN cell 200, user equipment 300 may be redirected to one of three UTRAN cells 211, 212, and 213. In accordance with at least one embodiment of the present invention, one of multiple carriers (FAs) may be selected. For example, carriers may be sequentially selected to prevent excess load on one specific carrier in accordance with at least one embodiment of the present invention. The present invention, however, is not limited thereto. Carriers (FAs) may be selected in consideration of various factors. For example, a load state on each carrier may be considered to select a carrier (FA) in order to evenly distribute the load over multiple carriers allocated with a target UTRAN cell. Since such operation may require supplementary information and extra processing power, one of carriers (FAs) may be randomly selected.

As described, base station 120 may select one of carriers (FAs) and transmit the information on the selected carrier to user equipment 300 through the RRC connection release message. Such operation will be described with reference to FIG. 5.

Figure 5:
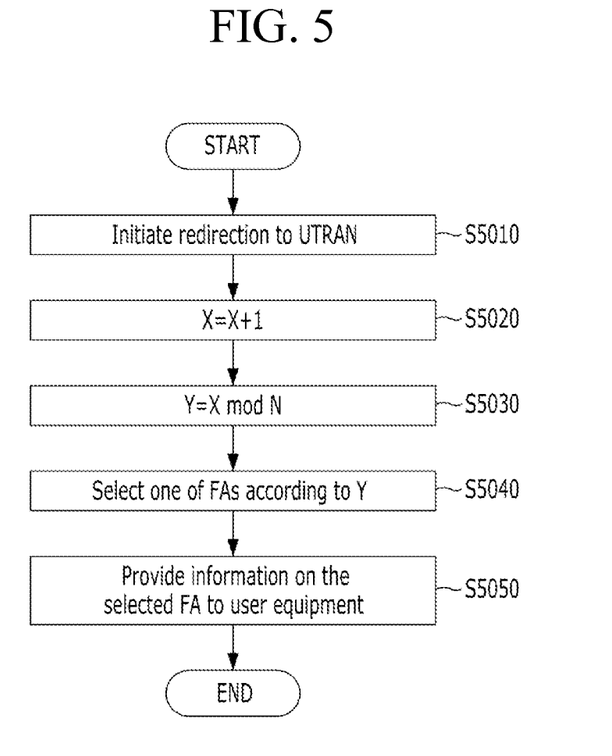
FIG. 5 shows selecting a carrier for frequency load distribution in accordance with embodiments of the present invention.

FIG. 5 shows selecting one of carriers (FAs) assigned to a corresponding cell of a target network to be redirected in accordance with embodiments of the present invention.

Referring to FIG. 5, base station 120 of E-UTRAN 100 may decide to redirect user equipment 300 from E-UTRAN 100 to UTRAN 200 at step S5010. As described, when the reception signal quality of user equipment 300 is poor, base station 120 of E-UTRAN 100 may decide redirecting user equipment 300 from E-UTRAN 100 to UTRAN 200.

Upon the decision, base station 120 may increase a value of X by 1 (X=X+1) at step S5020. X denotes the total number of network redirections performed related to a corresponding UTRAN cell. Base station 120 may store and manage such information associated with UTRAN cells.

At step S5030, base station 120 may apply a "mod" operation (mathematical modulus operator) to the total number of network redirections performed. For example, base station 120 may use Eq. 1 below.

$$Y = X \bmod N \qquad \text{Eq. 1}$$

In Eq. 1, X denotes the total number of network redirections, which is associated with a cell of a target network to be redirected. N denotes the total number of carriers (FAs) assigned to a corresponding cell of UTRAN 200. Y may denote the identification of a carrier (FA). Based on Eq. 1, one of the carriers may be selected. In this manner, the carriers may be sequentially selected so the load may be distributed evenly.

At step S5040, base station 120 may select one of carriers (FAs) matched with the result of Eq. 1, which is Y. At step S5050, base station 120 may transmit information on the selected carrier to user equipment 300. For example, base station 120 may include the information on the selected carrier in a RRC connection release message and transmit the RRC connection release message to user equipment 300 in accordance with at least one embodiment of the present invention.

As described, base station 120 may determine the redirection of user equipment 300 when the reception signal quality is evaluated as poor. Base station 120 may release connection between user equipment 300 and the current serving network such as E-UTRAN 100 through the RRC connection release procedure. After disconnecting user equipment 300 from the current serving network, user equipment 300 may be informed of the disconnection from base station 120 of E-UTRAN cell 110 through a RRC connection release message. User equipment 300 may establish connection, for the next communication service, to UTRAN 200 that is a network overlaid with E-UTRAN 100 in the heterogeneous overly network environment. Such establishing the connection may be achieved through a routing area update procedure in accordance with embodiments of the present invention. Hereinafter, such routing area update procedure will be described with reference to FIG. 6.

Figure 6:
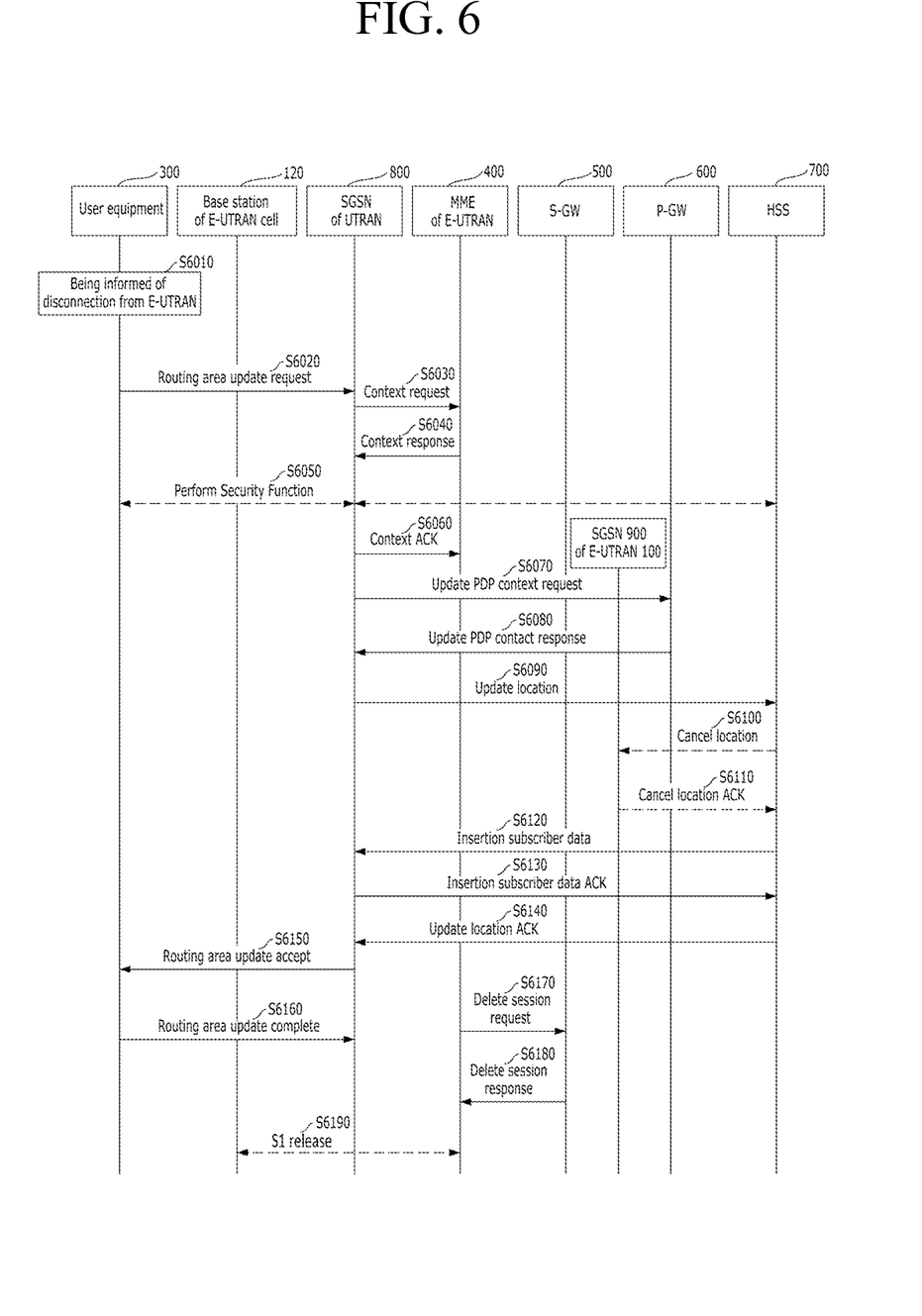
FIG. 6 shows establishing connection between user equipment and a target network in heterogeneous overlay network environment in accordance with embodiments of the present invention.

FIG. 6 shows establishing connection between user equipment and a network overlaid with a previous serving network in a heterogeneous overlay network environment in accordance with embodiments of the present invention.

Referring to FIG. 6, disconnection from a previous serving network may be informed at step S6010. For example, after base station 120 releases the connection between user equipment 300 and E-UTRAN 100, base station 120 transmits the RRC connection release message to user equipment 300. Upon the receipt of the RRC connection release message, user equipment 300 may be aware of the disconnection from E-UTRAN 100. Furthermore, the RRC connection release message may include information on UTRAN 200, especially a selected one of multiple carriers (FAs) assigned to a corresponding cell of UTRAN 200 in accordance with embodiments of the present invention.

At step S6020, a routing area update procedure may be initiated based on the information included in the RRC connection release message. For example, user equipment 300 may initiate the routing area update procedure based on the information included in the RRC connection release message when it is necessary. That is, user equipment 300 may establish connection to a network overlaid with E-UTRAN 100 in the heterogeneous overlay network environment, which may be UTRAN 200, when user equipment 300 needs a communication service. Particularly, user equipment 300 may transmit a routing area update request message to SGSN 800 of UTRAN 200. SGSN 800 of UTRAN 200 may be a serving GPRS support node for UTRAN 200. SGSN 800 may be connected between user equipment 300 and UTRAN 200. SGSN 800 may be responsible for the delivery of data packets from and to user equipment 300 within a service area. For example, SGSN 800 may perform packet routing and transfer, mobility management, logical link management, and authentication and charging functions.

At step S6030, upon the receipt of the routing area update request message, SGSN 800 of UTRAN 200 may request context associated with user equipment 300 to MME 400 of E-UTRAN 100, which is a previous serving network. In order to request, SGSN 800 may transmit a context request message to MME 400 of E-UTRAN 100.

At step S6040, MME 400 may receive the context request message, retrieve the context associated with user equipment 300, and provide the retrieved context associated with user equipment 300 to SGSN 800. For example, MME 400 may transmit a context response message to SGSN 800 in response to the content request message. The context response message may include information on the retrieved context associated with user equipment 300.

At step S6050, a security function may be performed between SGSN 800 of UTRAN 200 and home subscriber server (HSS) 700 in order to authenticate user equipment 300.

At step S6060, SGSN 800 of UTRAN 200 may transmit a context ACK message to MME 400 of E-UTRAN 100 when user equipment 300 is successfully authenticated. At step S6070, SGSN 800 of UTRAN 200 may transmit an update PDP context request message to packet data network gateway (P-GW) 600. At step S6080, P-GW 600 may transmit an update PDP context response message in response to the update PDP context request message.

At step S6090, SGSN 800 may transmit an update location message to HSS 700. Upon the receipt of the update location message, HSS 700 may transmit a cancel location message to SGSN 900 of E-UTRAN 100 which is a previous serving network at step S6100. At step S6110, SGSN 900 of E-UTRAN 100 may cancel the context associated with user equipment 300 in response to the cancel location message and transmit a cancel location ACK message to HSS 700.

At step S6120, HSS 700 may transmit an insertion subscriber data message to SGSN 800 of UTRAN 200 after receiving the cancel location ACK message from SGSN 900 of E-UTRAN 100. At step S6130, SGSN 800 of UTRAN 200 may transmit an insertion subscriber data ACK message to HSS 700 in response to the insertion subscriber data message.

At step S6140, HSS 700 may transmit an update location ACK message to SGSN 800 of UTRAN 200 in response to the insertion subscribed data ACK message. At step S6150, SGSN 800 may transmit a routing area update accept message to user equipment 300. At step S6160, user equipment 300 may transmit a routing area update compete message to SGSN 800 in response to the routing area update access message.

At step S6170, MME 400 of E-UTRAN 100 may request session deletion to S-GW 500. In order to request, MME 400 may transmit a session deletion request message to S-GW 500. At step S6180, S-GW 500 may transmit a delete session response message to MME 400 of E-UTRAN 100. At step S6190, base station 300 and MME 400 of E-UTRAN 100 may release an interface S1.

Figure 7:
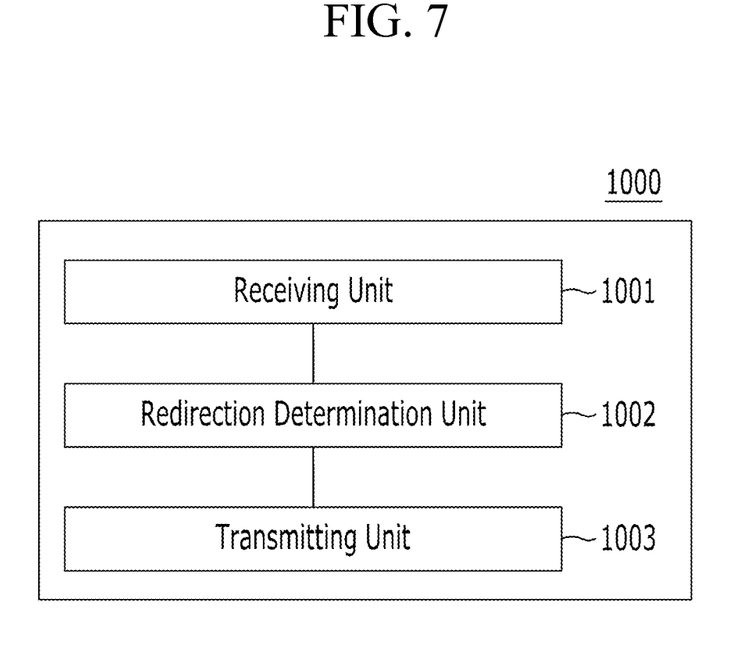
FIG. 7 shows an apparatus for network redirection in heterogeneous overlay networks in accordance with embodiments of the present invention.

FIG. 7 shows an apparatus for network redirection in heterogeneous overlay networks in accordance with embodiments of the present invention.

The apparatus may be shown as an independent apparatus in FIG. 7, but the present invention is not limited thereto. For example, the apparatus may be included in base stations of E-UTRAN 100 and UTRAN 200, such as an eNodeB of E-UTRAN 100 or a NodeB of UTRAN 200. Furthermore, the apparatus may be implemented as at least one element of other entities in a related network, which are capable of communicating with base stations in the related network.

Referring to FIG. 7, apparatus 1000 may include receiving unit 1001, redirection unit 1002, and transmitting unit 1003 in accordance with at least one embodiment of the present invention. Apparatus 1000 may perform at least one of operations described above with reference to FIG. 2 to FIG. 6. Accordingly, each constituent element of apparatus 1000 will be briefly described.

Receiving unit 1001 may receive measurements of reception signal quality of user equipment 300 regularly. Receiving unit 1001 may transfer the received measurements of reception signal quality of user equipment 300 to redirection unit 1002 in order to enable redirection unit 1002 to determine whether the reception signal quality of user equipment 300 is poor. Furthermore, receiving unit 1001 may receive information on multiple carriers, such as FAs, assigned to each cell of UTRAN 200. Receiving unit 1001 may provide such received information to redirection unit 1002 in order to select one of the multiple carriers or transmit information on the selected carrier to user equipment 300.

Redirection unit 1002 may determine whether a network redirection procedure is necessary or not based on the received measurements of reception signal quality of user equipment 300. That is, redirection unit 1002 may decide to redirect user equipment 300 from one network to the other in the heterogeneous overlay network based on the measurement results of the reception signal quality of user equipment 300. For example, when at least one of the measurement results is lower than the predetermined threshold, redirection unit 1002 may determine that user equipment 300 has the poor reception signal quality. Furthermore, when such poor reception signal quality maintains for the predetermined duration, redirection unit 1002 may decide to redirect user equipment 300 from the current serving network to the other in the heterogeneous overlay network environment. Since such operation of redirection unit 1002 was already described with reference to FIG. 3, the detailed descriptions thereof will be omitted.

Transmitting unit 1003 may transmit the information on the decided network redirection to user equipment 300 and other entities in networks in the heterogeneous overlay network. Such network redirection information may include information on at least one of a next serving network, a current serving network, frequency allocations (FA), and a selected one of FAs, but the present invention is not limited thereto. Particularly, transmitting unit 1003 may transmit a RRC connection release message including information on a selected one of FAs associated with a UTRAN cell that user equipment is redirected to.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for redirecting user equipment from a current serving cell of a first network to a corresponding target cell of a second network in a heterogeneous overlay network environment, the method at a current serving base station comprising:

receiving signal quality measurements from user equipment coupled to the current serving cell of the first network;

determining whether signal quality of the user equipment is lower than predetermined reference quality based on at least one of the received signal quality measurements; and redirecting the user equipment from the current serving cell of the first network to the corresponding target cell of the second network when the signal quality of the user equipment is lower than the predetermined reference quality, wherein the determining includes:
comparing at least one of the signal quality measurements with corresponding predetermined thresholds;
determining the signal quality of the user equipment is lower than the predetermined reference quality when the at least one of the signal quality measurements is lower than the corresponding thresholds;
determining whether the signal quality of the user equipment maintains lower than the predetermined reference quality for a predetermined duration; and
deciding to redirect the user equipment from the current serving cell of the first network to the corresponding target cell of the second network when the signal quality of the user equipment maintains lower for the predetermined duration.

2. The method of claim 1, wherein the signal quality measurements are results of measuring at least one of interference and noise ratio (SINR) and reference signal received power (RSRP) of a reception signal of the user equipment.

3. The method of claim. 1, wherein the first network is evolved universal mobile telecommunication system terrestrial radio access network (E-UTRAN) and the second network is UTRAN.

4. The method of claim 1, wherein the redirecting includes:
releasing connection between the user equipment and the first network; and
informing the user equipment of the releasing the connection from the first network.

5. The method of claim 4, wherein the releasing includes performing a radio resource control (RRC) release procedure.

6. The method of claim 5, wherein the informing includes transmitting a RRC connection release message to the user equipment wherein the RRC connection release message includes information on the corresponding target cell of the second network.

7. The method of claim 4, wherein the redirecting further includes:
selecting one of multiple carriers assigned to the corresponding target cell of the second network; and
providing information on the selected carrier to the user equipment.

8. The method of claim 7, wherein the selecting includes:
using a relation: "X mod N" to select the one of multiple carriers assigned to the corresponding target cell of the second network, where X denotes a total number of network redirections performed associated with the corresponding target cell of the second network and N denotes a total number of carriers assigned to the corresponding target cell of the second network; and
selecting one having identification matched with the result of the equation from the carriers assigned to the corresponding target cell.

9. The method of claim 7, wherein the providing includes:
including the information on the selected carrier in a RRC connection release message; and transmitting the RRC connection release message to the user equipment.

10. A method for redirecting user equipment from a current serving cell of a first network to a corresponding target cell of a second network in a heterogeneous overlay network environment, the method at the user equipment comprising:
- transmitting signal quality measurements to a current serving base station of the first network;
- receiving a connection release message from the current serving base station of the first network; and
- establishing connection to the corresponding target cell of the second network based on information included in the connection release message,
- wherein the connection release message is created through a procedure by the current serving base station of the first network, including:
  - receiving the signal quality measurements from the user equipment;
  - comparing at least one of the signal quality measurements with corresponding predetermined thresholds;
  - determining the signal quality of the user equipment is lower than the predetermined reference quality when the at least one of the signal quality measurements is lower than the corresponding thresholds;
  - determining whether the signal quality of the user equipment maintains lower than the predetermined reference quality for a predetermined duration; and
  - deciding to redirect the user equipment from the current serving cell of the first network to the corresponding target cell of the second network when the signal quality of the user equipment maintains lower for the predetermined duration.

11. The method of claim 10, further comprising:
receiving a communication service from the corresponding target base station of the second network after the establishing; and
transmitting signal quality measurements to the corresponding target base station of the second network.

12. The method of claim 10, wherein the transmitting includes:
- measuring at least one of interference and noise ratio (SINR) and reference signal received power (RSRP) of a reception signal of the user equipment; and
- providing the measurements of the at least one of S1NR and RSRP to the current serving base station of the first network.

13. The method of claim 10, wherein the connection release message is a radio resource control (RRC) connection release message.

14. The method of claim 13, wherein the RRC connection release message includes information on a carrier of the corresponding target cell of the second network for communication with the corresponding target cell.

15. The method of claim 10, wherein the establishing includes:
performing a routing area update procedure based on information included in the connection Release.

16. An apparatus for redirecting user equipment from a current serving cell of a first network to a corresponding target cell of a second network in a heterogeneous overlay network environment, the apparatus comprising:
- a receiving unit configured to receive signal quality measurements from user equipment coupled to the current serving cell of the first network;
- a redirection unit configured to determine whether signal quality of the user equipment is lower than a predetermined reference quality based on at least one of the received signal quality measurements and to perform a network redirect procedure when the signal quality of the user equipment is determined as lower than the predetermined reference quality; and
- a transmitting unit configured to transmit a connection release message to the user equipment after the network redirection procedure,
- wherein the redirection unit is configured to:
  - compare at least one of the signal quality measurements with corresponding thresholds;
  - determine the signal quality of the user equipment is lower than the predetermined reference quality when the at least one of the signal quality measurements is lower than the corresponding thresholds:
  - determine whether the signal quality of the user equipment maintains lower than the predetermined reference quality for a predetermined duration; and
  - decide e to redirect the user equipment from the current serving cell of the first network to the corresponding target cell of the second network when the signal quality of the user equipment maintains lower for the predetermined duration.

17. The apparatus of claim 16, wherein:
the redirection unit is configured to perform a radio resource control (RRC) connection release procedure in order to release connection between the user equipment and the first network; and
the transmitting unit is configured to transmit a RRC connection release message including information on the corresponding target cell of the second network.

18. The apparatus of claim 17, wherein the redirection unit is configured to:
select one of multiple carriers assigned to the corresponding target cell of the second network; and
provide information on the selected carrier to the user equipment through the RRC connection release message.

19. The apparatus of claim 17, wherein the redirection unit is configured to:
use a relation: "X mod N" to select the one of multiple carriers assigned to the corresponding target cell of the second network, where X denotes a total number of network redirections performed associated with the corresponding target cell of the second network and N denotes a total number of carriers assigned to the corresponding target cell of the second network; and
select one having identification matched with the result of the equation from the carriers assigned to the corresponding target cell.

* * * * *